Jan. 4, 1944. J. MIHALYI 2,338,657
SHUTTER AND CAMERA STRUCTURE
Filed Jan. 30, 1942 3 Sheets-Sheet 1
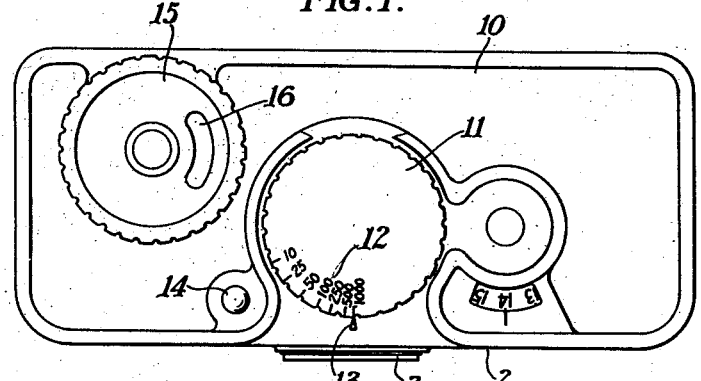
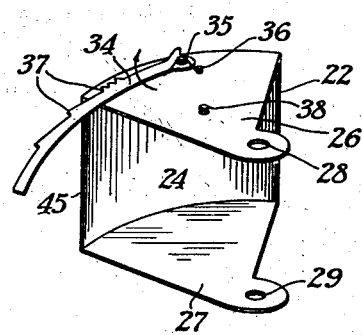
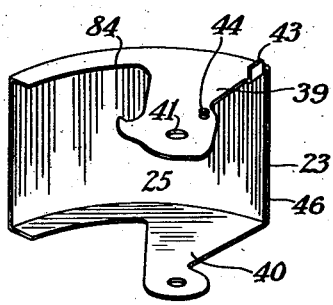
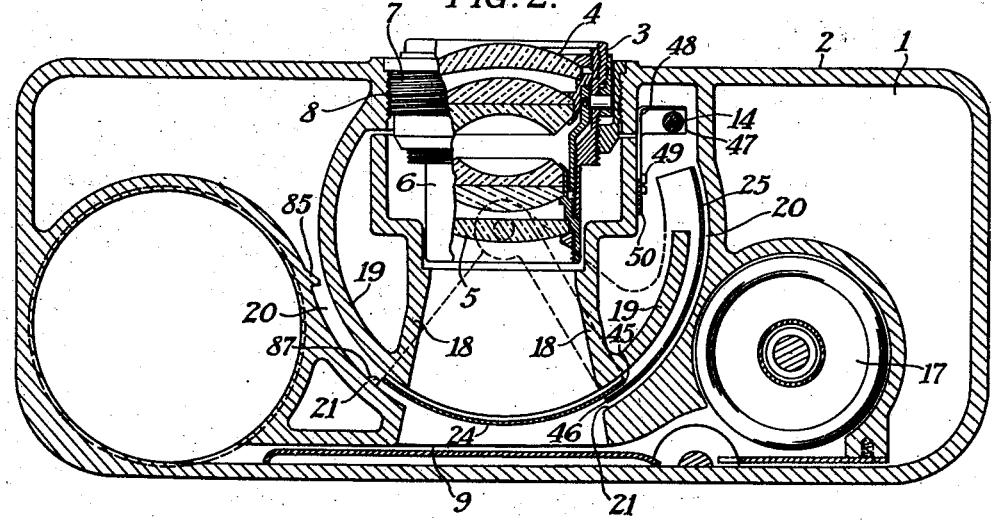
JOSEPH MIHALYI
INVENTOR
BY
ATTORNEYS Jan. 4, 1944.  J. MIHALYI  2,338,657
SHUTTER AND CAMERA STRUCTURE
Filed Jan. 30, 1942  3 Sheets-Sheet 2
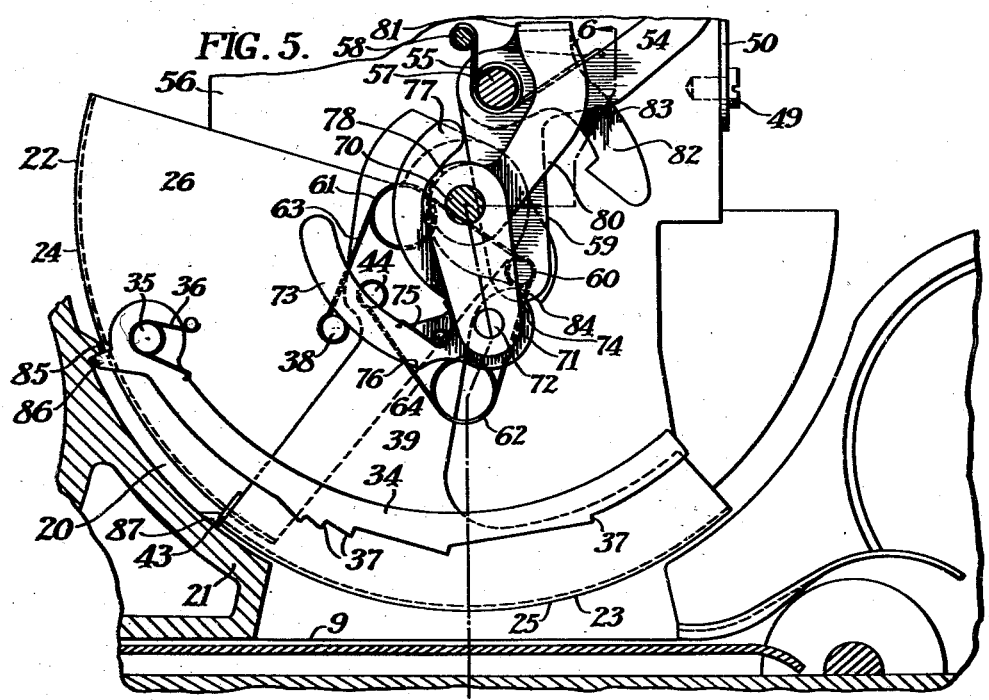
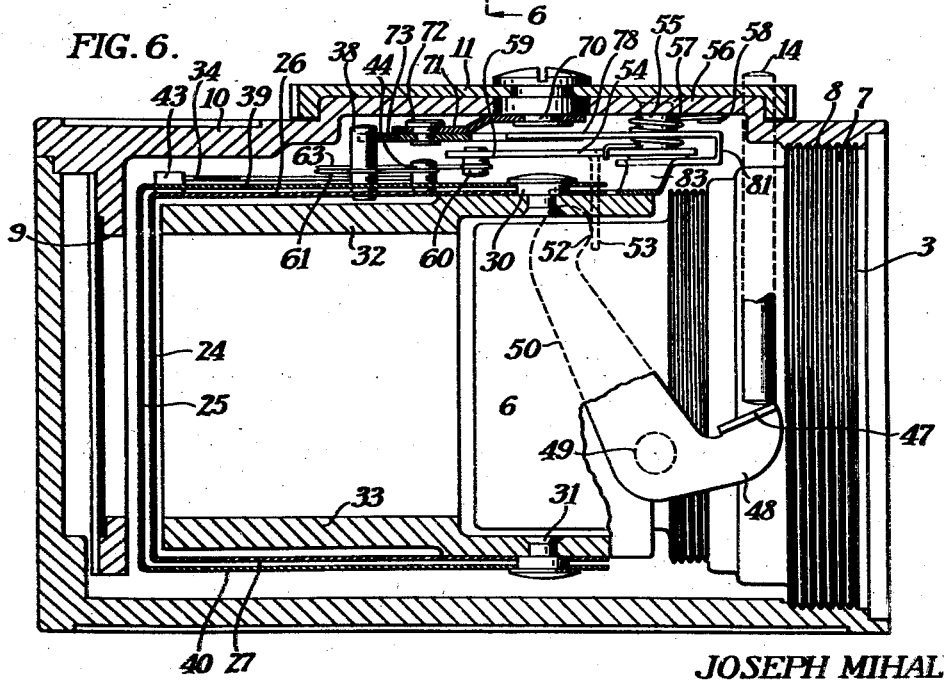
JOSEPH MIHALYI
INVENTOR
BY
ATTORNEYS Jan. 4, 1944. J. MIHALYI 2,338,657
SHUTTER AND CAMERA STRUCTURE
Filed Jan. 30, 1942 3 Sheets-Sheet 3

JOSEPH MIHALYI
INVENTOR

BY

ATTORNEYS

Patented Jan. 4, 1944

2,338,657

UNITED STATES PATENT OFFICE 2,338,657

SHUTTER AND CAMERA STRUCTURE

Joseph Mihalyi, Rochester, N. Y., assignor to Eastman Kodak Company, Rochester, N. Y., a corporation of New Jersey Application January 30, 1942, Serial No. 428,897

8 Claims. (Cl. 95—58)

This invention relates to photography and more particularly to simple types of camera shutters. One object of my invention is to provide a shutter of simple and inexpensive construction with which a large variety of shutter speeds may be obtained. Another object of my invention is to provide a shutter construction particularly adapted for cameras utilizing extremely small size film. Still another object of my invention is to provide a shutter of the automatic type in which it is only necessary to depress a shutter trigger to make an exposure. A still further object of my invention is to provide a shutter of a non-setting type with which fast as well as slow speeds may be obtained and in which the shutter may lie relatively close to the focal plane of a film to be exposed. Other objects will appear from the following specification, the novel features being particularly pointed out in the claims at the end thereof.

There are many miniature cameras now on the market utilizing film of 35 mm. width and there are some cameras utilizing film of 16 mm. width, both these film widths being standard motion picture camera film. My invention is particularly directed to a camera using such film and preferably the 16 mm. film, although obviously my invention is not limited to a shutter useful for only narrow widths of film. However, it is much easier to provide a relatively accurate shutter obtaining high speeds when the size of the film is small because of the travel of the shutter blades. I am, therefore, able to obtain high speeds in an inexpensive shutter on the smaller sizes of film; whereas if the same shutter is to be used on film of a larger size the speeds must necessarily be reduced more or less in accordance with the size of the film.

It has been customary to provide miniature cameras with comparatively expensive shutter equipment so that fast exposures as well as delayed instantaneous exposures could readily be made. One of the objects of my invention is to provide an inexpensive shutter for such cameras in which it is unnecessary to set the shutter in order to determine the desired range of the exposures.

Coming now to the drawings in which like reference characters denote like parts throughout:

Fig. 1 is a top plan view of a camera having a shutter illustrating a preferred embodiment of my invention;

Fig. 2 is a somewhat enlarged sectional view through the camera shown in Fig. 1;

Fig. 3 is a perspective view of the first shutter blade removed from the camera;

Fig. 4 is a perspective view of the second shutter blade removed from the camera;

Fig. 5 is an enlarged fragmentary plan view partially in section of the shutter blades in the position they assume at the end of an exposure making movement;

Fig. 6 is a sectional view taken through the camera and through the shutter on line 6—6 of Fig. 5;

Figure 7:
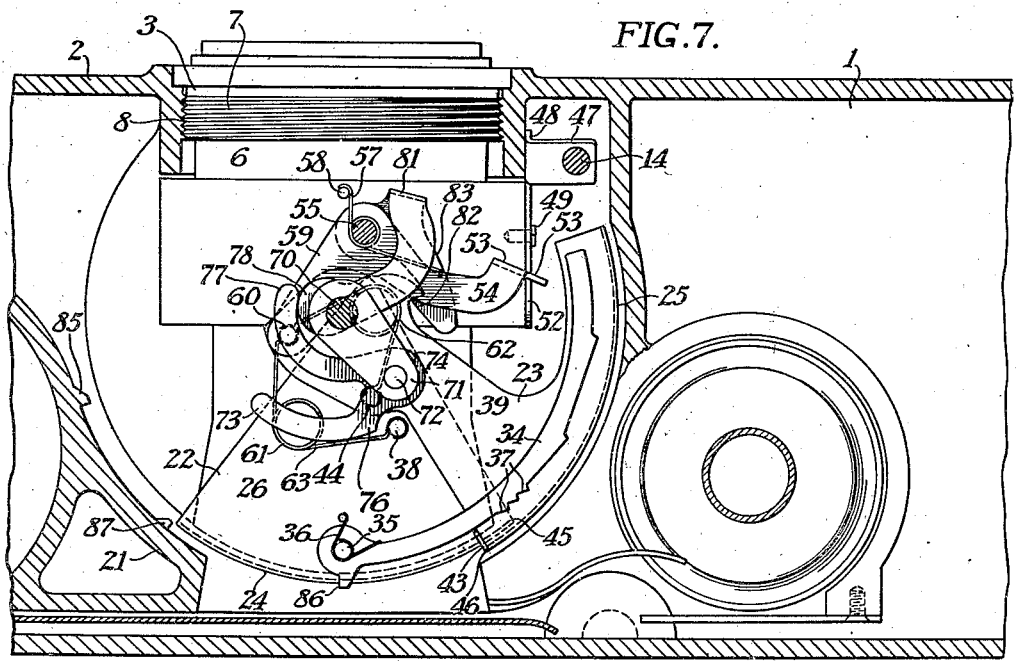
Fig. 7 is a plan view showing parts of the camera in section and showing the shutter mechanism in position for making an exposure.

While I wish it to be distinctly understood that my invention is not limited to any particular size camera, I have in Fig. 1 illustrated full size a camera which can embody the shutter which is shown on a larger scale in the other figures of the drawings.

The camera may consist of a body 1 preferably made of die cast or molded material, although sheet metal may be used if desired. On the front wall 2 of this camera there is mounted a lens cell 3 carrying the front elements 4 of an objective, the rear elements 5 of which are carried in a rearwardly extending lens tube 6. I prefer to provide a threaded connection between the camera lens tube 7 and the camera body which is threaded at 8 so that, by turning this lens, the entire objective may be moved for focusing an image on a film lying across the exposure aperture 9. Such lenses are necessarily of short focal length requiring extremely little movement for focusing from, say 4 feet to infinity. If desired, of course, an objective can be used in which only the front lens element is moved for focusing, but I prefer to focus the complete objective as above described.

The top wall 10 of the camera may carry a dial plate 11 having shutter speed graduations 12 thereon which may be brought opposite to a pointer 13 to indicate the speed setting of the shutter. A trigger 14 may project upwardly for operating the shutter and in the present instance I provide a film winding knob 15 which may include a window 16 through which indicating marks on the end of a film spool flange 17 may be viewed from the outside of the camera.

I prefer to provide an automatic exposure counter, but since this forms no part of the present invention it is not shown in the drawings.

On the inside of the camera body 1 there is a pair of angularly disposed walls 18 forming a light chamber extending from the objective to exposure frame 9, and I preferably provide semicylindrical walls 19 which form one side of arcuate slots 20 in which the shutter blades may swing, these slots including the arcuately-shaped walls 21 as best indicated in Fig. 2.

The shutter is of the type including two shutter blades, the first blade 22 being shown in perspective in Fig. 3 and the second blade 23 being shown in Fig. 4. Each of these blades includes a semicylindrical portion; 24 on blade 22, and 25 on blade 23. Each blade includes wedge-shaped radial arms on which the blades are swingingly mounted.

Blade 22 includes the arms 26 and 27 having apertures 28 and 29 which engage studs 30 and 31 carried by the camera walls 32 and 33 as best shown in Fig. 6. The first blade 22 likewise carries a latch element 34 pivoted on a stud 35 and includes a light spring 36 tending to swing the arm in the direction shown by the arrow in Fig. 3. The latch element includes a plurality of steps or shoulders 37 which may correspond with the number of the various exposures which can be obtained. A pin 38 extends upwardly from the arm 26.

The second shutter blade 23 includes a pair of radially extending arms 39 and 40 apertured at 41 and 42 to engage the studs 30 and 31 on which the second blade is pivotally mounted. The arm 39 includes an upwardly extending lug 43 and a pin 44.

Figure 8:
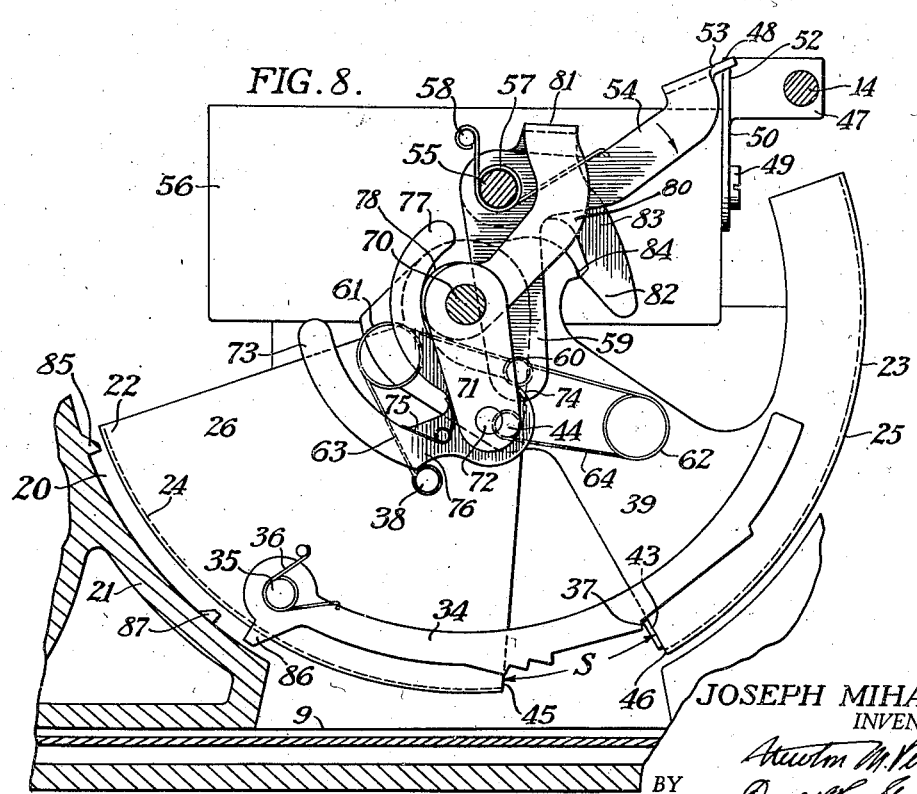
Fig. 8 is a fragmentary enlarged plan view showing the shutter mechanism at the start of an exposure making movement.

In general, the shutter blades are swung past the exposure frame 9 and the width of a slot S formed between the rear edge 45 of the first shutter blade 22 and the front edge 46 of the second shutter blade 23 forms an exposure slot as the shutter blades swing in a clockwise direction with reference to Fig. 8 across the exposure frame 9. In order to move these shutter blades without the necessity of first separately tensioning a spring, the following mechanism is employed. Referring particularly to Figs. 6 and 8, the shutter trigger member 14 extends downwardly into the camera body and has contact with a flange 47 on one arm 48 of a bell crank lever pivoted at 49 to the shutter body and including an upwardly extending arm 50 having a rounded end 52 engaging with a downwardly formed lug 53 on the end of a lever 54 pivoted at 55 to a shutter mechanism plate 56. A spring 57 encircling the stud 55 and having one end engaging a pin 58 and the other end engaging the lever arm 54 normally tends to move this lever in a clockwise direction as indicated by the arrow in Fig. 8. However, when the trigger 14 is depressed the lever 54 is moved in a counterclockwise direction by the downward movement of the trigger.

The lever 54 forms one arm of a bell crank, the other arm 59 carrying an upstanding pin 60. This pin is encircled by a spring having a pair of similar sections 61 and 62 of a hairpin shape, spring 61 including the spring arm 63 which encircles the pin 38 of the first shutter member and spring 62 having an arm 64 encircling the pin 44 of the shutter blade 2. While I have in the present instance utilized a single double-ended spring to facilitate assembly, each section of which resembles a hairpin, I may separate the two hairpin spring sections 61 and 62 without altering the operation of the shutter. In operation, the spring, or spring sections 61 and 62 have partly a joint function and partly a separate function in that, while both sections are set and released, one section may operate in advance of the other section in producing different types of exposures. When lever arm 59 is moved so that the hairpin springs 61 and 62 will be tensioned, as by depressing the trigger, when the stud 60 passes the pins 38 and 44, shown in their rest position in Fig. 7, the shutter blades would swing around in a clockwise direction except for a latching structure used to control the speed of the exposure. This latch retards movement of the second shutter blade. I have found that with such a shutter a wide range of exposures can be produced by merely varying the opening between the edges 45 and 46 of the two shutter blades.

This variation occurs in the following manner. The speed setting dial 11 on the top of the camera wall is carried by a shaft 70 projecting down through the casing and carrying an arm 71, which arm carries a stud 72 on which the arcuately-shaped lever 73 is pivotally mounted, this lever being normally held in the position shown in Fig. 8 in which a lug 74 engages an edge of the lever 71 as lever 73 is moved by a light spring 75 in a clockwise direction about the stud 72. The arm 73 has a shoulder 76 adapted to engage the pin 38 and when the dial plate is moved the position of the arm 71 relative to the arm 73 is changed so that after the release of the shutter the arm 73 may swing through an arc which will cause the end 77 of the lever 73 to strike against the release lever 78. Lever 78 is pivoted at 55 to the mechanism plate 56 as indicated in Fig. 5. The release lever 78 is of peculiar shape having one arm 80 which is formed downwardly at 81 and which is pivoted upon the stud 55 and likewise includes the hook 82 on an outwardly extending arm 83. This hook, as best shown in Fig. 8, is positioned to engage the hook 84 on the second shutter member 23. Fig. 8 shows the parts in the moment of release of the second shutter blade 23, the first shutter blade 22 having already been moved a distance to provide a slot S between the edges 45 and 46 so that this slot by swinging across the exposure frame 9 may make an exposure.

It should be noticed that when the parts lie in their position of rest as indicated at Fig. 7, the pin 38 lies behind the shoulder 76 and the two-fingered lever having ends 73 and 77 is in an inoperative position, in which position it will remain until the first shutter member 22 swings to the position shown in Fig. 8. When the pin 38 strikes the shoulder 76 the two-fingered lever having ends 73 and 77 will turn upon its pivot 72 causing the lever 77 to release the latch 82 promptly so that the second shutter blade 23 may start to move after the first shutter blade 22. Before this release occurs, the latch arm 34 is moved across the upstanding lug 43 and at the moment of release one of the teeth 37 of the latch arm will lie in front of the lug 43 as indicated at Fig. 8. Thus, the second shutter blade 23 will be held in spaced relationship to the shutter blade 22 and because its driving spring 62 may be slightly heavier or in the showing in Fig. 8 may be compressed slightly more than the spring 61 of the first shutter member 22, lug 43 will be held in engagement with a tooth 37 on the latch member.

It is of course necessary for the latch member 34 to release the lug 43 before the shutter member 23 can completely close and move into the position of Fig. 5. This is accomplished in the manner shown in Fig. 5 by providing an upstanding lug 85 which extends from the camera casing into the arcuate pathway 20 and into the path of a lug 86 carried by the lever 34. Thus, when the shutter member 22 reaches the position shown in Fig. 5, this lug swings the latch arm 34 in a counterclockwise direction releasing any one of the teeth 37 of the latch from the upstanding lug 43. Thus the second shutter member 23 is permitted to continue its swinging movement after the swinging movement of the first shutter blade 22 has been completed and until an edge of the shutter blade 23 strikes a second lug 87 formed in the arcuate groove 20 also as indicated at Fig. 5.

When the parts have reached the Fig. 5 position, the exposure is completed and the trigger 14 is released. The lever 54 follows the bell crank lever 50 as the trigger moves in its reverse direction under the impulse of the spring 57, thus carrying the pin 60 on the arm 59 in a counterclockwise direction again tensioning the hairpin springs 61 and 62, and, as the stud 60 swings past the center of the pins 38 and 44, the hairpin springs 61 and 62 will expand and will return the shutter blades to their initial position of rest in which they are ready for the next exposure. This position is shown in Fig. 7.

From the position shown in Fig. 5 at the completion of an exposure it will be noticed that the pins 38 and 44 are in substantial radial alignment with the stud 55 on which the lever 59 turns so that the pin 60 carried by this lever and carrying one end of the springs 61 and 62 will simultaneously tension and release these springs so that the shutter members 22 and 23 will move together in a reverse direction to that in which they move to make an exposure. Consequently the blades remain in the overlapping position shown in Fig. 5 during the setting movement and no light can enter to fog the film.

The operation of my improved shutter is simple in spite of the rather long explanation required to describe the shutter blade control. If it is assumed that 1/25th of a second exposure is desired, an operator merely turns the dial 11 until the graduation 25 lies opposite the pointer 13. The shutter is now ready for an exposure.

The operator merely depresses the trigger member 14 and as this movement takes place the bell crank lever pivoted at 49 engages arm 53 of lever 54 rocking the arm 59 to tension the springs 61 and 62 and when spring 61 is tensioned and released shutter blade 22 moves to the extent permitted by the two-fingered latch 73 and 77 which, when struck by the pin 38, causes the arm 77 to engage the release lever moving latch 82 from latch 84 so that the second shutter member 23 then moves with the lug 43 against a suitable tooth 37 of latch 34. The two shutter blades then move together until arm 86 of latch 34 strikes lug 85, thus releasing tooth 37 from lug 43 and permitting the blade 23 to continue on to close the exposure aperture until the position of Fig. 5 is reached. These movements take place rapidly and continuously during the downward movement of the shutter trigger. To restore the parts to their initial position of Fig. 7 it is only necessary to release pressure on the trigger 14 and the shutter blades 22 and 23 will return to this position without opening up a slot S between the edges 45 and 46 so that the shutter is a self capping one even though it is an automatic type of shutter.

While I have described as a preferred embodiment of my invention a shutter which is particularly suitable for an extremely small camera, it is obvious that, except for the speed which can be obtained with such a shutter, the size is not material and relatively large shutters could be constructed in this manner if desired.

In the described embodiment of my invention shutter speeds from 1/1000th of a second to 1/10th of a second may be obtained solely by altering the width of the slot between the shutter blades. If slower speeds are deemed necessary, a known type of retard may be used. If the shutter is of a much larger size, the highest speeds obtainable may be considerably less than the 1/1000th of a second indicated above.

What I claim as new and desire to secure by Letters Patent of the United States is:

1. In a shutter for cameras, the combination with a pair of arcuate blades, of a pivotal mount on which the blades are mounted to swing through arcuate paths, a lever, a spring attached to each shutter blade at one end and attached to said lever at the other end, means for swinging the lever to tension and release the springs including a trigger, and spring means more powerful than the shutter blade springs for normally holding the trigger in a position of rest whereby said trigger may, by swinging the lever tension and release the springs to actuate both shutter blades moving them in an exposure making direction and said spring means for normally holding the trigger in a position of rest may, upon release of the trigger, move said blades in an opposite direction.

2. In a shutter for cameras, the combination with a pair of arcuate blades, of a pivotal mount on which the blades are mounted to swing through arcuate paths, a lever, a spring attached to each shutter blade at one end and attached to said lever at the other end, means for swinging the lever to tension and release the springs including a trigger, and spring means more powerful than the shutter blade springs for normally holding the trigger in a position of rest whereby said trigger may, by swinging the lever tension and release the springs to actuate both shutter blades moving them in an exposure making direction and said spring means for normally holding the trigger in a position of rest may, upon release of the trigger, move said blades in an opposite direction, and mechanism for releasing one shutter blade after the other shutter blade has started to move.

3. In a shutter for cameras, the combination with a pair of arcuate blades, of a pivotal mount on which the blades are mounted to swing through arcuate paths, a lever, a spring attached to each shutter blade at one end and attached to said lever at the other end, means for swinging the lever to tension and release the springs including a trigger, and spring means more powerful than the shutter blade springs for normally holding the trigger in a position of rest whereby said trigger may, by swinging the lever tension and release the springs to actuate both shutter blades moving them in an exposure making direction and said lever spring means normally holding the trigger in a rest position may, upon release of the trigger, move said blades in an opposite direction, and a latch for holding one shutter blade against movement in an exposure making direction positioned to be released through movement of the other shutter blade in an exposure making direction.

4. In a shutter for cameras, the combination with a pair of arcuate blades, of a pivotal mount on which the blades are mounted to swing through arcuate paths, a lever, a spring attached to each shutter blade at one end and attached to said lever at the other end, means for swinging the lever to tension and release the springs including a trigger, and spring means more powerful than the shutter blade springs for normally holding the trigger in a position of rest whereby said trigger may, by swinging the lever tension and release the springs to move the shutter blades in a direction to make an exposure, one shutter blade constituting a first shutter member released by the trigger by tensioning and release its spring, the second shutter blade constituting a second shutter member, a latch for holding the second shutter blade against movement when its spring is tensioned, and movable mechanism including a latch release operable by the first shutter blade moving in an exposure making direction for releasing the second shutter blade for movement in an exposure making direction after a predetermined movement of the first shutter blade to make an exposure.

5. In a shutter for cameras, the combination with a pair of arcuate blades, of a pivotal mount on which the blades are mounted to swing through arcuate paths, a lever, a spring attached to each shutter blade at one end and attached to said lever at the other end, means for swinging the lever to tension and release the hairpin springs including a trigger, and spring means operably connected to the lever and trigger for normally holding the trigger in a position of rest whereby said trigger may, by swinging the lever tension and release the hairpin springs to move the shutter blades in a direction to make an exposure, one shutter blade constituting a first shutter member released by the trigger by tensioning and release its hairpin spring, the second shutter blade constituting a second shutter member, a latch for holding the second shutter blade against movement when its hairpin spring is tensioned, and movable mechanism including a latch release operable by the first shutter blade for releasing the second shutter blade after a predetermined movement of the first shutter blade to make an exposure, said spring operably connected to the trigger and the spring tensioning lever having sufficient strength to move the lever for operating the hairpin springs in an opposite direction to restore both the trigger and the shutter blades to a normal position of rest ready for making an exposure.

6. In a shutter for cameras, the combination with a pair of arcuate blades, of a pivotal mount on which the blades are mounted to swing through arcuate paths, a lever, a spring attached to each shutter blade at one end and attached to said lever at the other end, means for swinging the lever to tension and release the springs including a trigger, and spring means for normally holding the trigger in a position of rest whereby said trigger may, by swinging the lever tension and release the springs to move the shutter blades in a direction to make an exposure, one shutter blade constituting a first shutter member released by the trigger by tensioning and releasing its spring, the second shutter blade constituting a second shutter member, a latch element for holding the second shutter blade against movement when its spring is tensioned, a lug on the second shutter member constituting a second latch element normally engaging said first-mentioned latch element to hold the second shutter member against movement, a speed dial, an adjustable latch release carried by the dial, and means carried by the first shutter for engaging and moving the latch release in accordance with its setting to release the second shutter after a predetermined movement of the first shutter whereby an exposure of known duration may be made, said spring normally holding the trigger in a rest position through said lever tensioning and releasing said shutter blade rings, moving said blades in a non-exposure making direction when said trigger is released.

7. In a shutter for cameras, the combination with a pair of arcuate blades, of a pivotal mount on which the blades are mounted to swing through arcuate paths, a lever, a spring attached to each shutter blade at one end and attached to said lever at the other end, means for swinging the lever to tension and release the springs including a trigger, and spring means for normally holding the trigger in a position of rest whereby said trigger may, by swinging the lever tension and release the springs to move the shutter blades in a direction to make an exposure, one shutter blade constituting a first shutter member released by the trigger by tensioning and release its spring, the second shutter blade constituting a second shutter member, a latch element for holding the second shutter blade against movement when its spring is tensioned, a lug constituting a second latch element on the second shutter member normally engaging said first-mentioned latch element to hold the second shutter member against movement, a speed dial, an adjustable latch release carried by the dial, and means carried by the first shutter for engaging and moving the latch release in accordance with its setting to release the second shutter after a predetermined movement of the first shutter, a shutter blade spacing latch including an arm pivoted to one shutter member including teeth engaging the other shutter member for retaining a known spacing between the shutter blades when the second shutter member is released, and an abutment positioned to strike and release said blade spacing latch.

8. In a camera the combination with a camera body including an objective spaced from an exposure frame, of walls inside the camera body and between the objective and the exposure frame forming between them arcuate slots centered about the objective, pivots on each side of the objective positioned on the centers of the arcuate slots, arcuate shutter leaves carried by said pivots to swing in said slots and adjacent the exposure frame to control light passing through said objective to the exposure frame, mechanism for moving said shutter leaves, at least partially positioned over a portion of the camera objective to form a compact camera and shutter structure.

JOSEPH MIHALYI.